United States Patent
Baravian et al.

Patent Number: 5,901,114
Date of Patent: May 4, 1999

[54] CIRCUIT FOR MEASURING THE CUT-OFF TIME OF AN ELECTRONIC SYSTEM

[75] Inventors: Philippe Baravian, Alfortville; Alfred Permuy, Rueil Malmaison, both of France

[73] Assignee: Valeo Electronique, Creteil Cedex, France

[21] Appl. No.: 08/895,222

[22] Filed: Jul. 16, 1997

[30] Foreign Application Priority Data

Jul. 17, 1996 [FR] France ................................ 96 08933

[51] Int. Cl.⁶ .................. G04F 8/00; G04B 47/00; G01Y 1/44
[52] U.S. Cl. ...................... 368/6; 368/10; 368/113; 368/121; 324/105
[58] Field of Search ........................ 368/1, 5, 6, 8, 368/9, 10, 110–113, 121; 324/104–106; 327/77, 80, 84, 588

[56] References Cited

U.S. PATENT DOCUMENTS

4,450,719 5/1984 Nishimura et al. ...................... 73/204

FOREIGN PATENT DOCUMENTS

25 49 703 5/1977 Germany.

OTHER PUBLICATIONS

French Search Report dated Mar. 10, 1997.

*Primary Examiner*—Vit Miska
*Attorney, Agent, or Firm*—Morgan & Finnegan, L.L.P.

[57] ABSTRACT

A circuit for measuring the duration of a cut-off period in the power supply to an electronic system, for example the control system of a motor vehicle starter, comprises a voltage splitting bridge and a processing unit receiving the output of the splitting bridge. The bridge supply voltage is derived from the power supply to the electronic system, and the bridge has a branch which includes a temperature variable resistor. The processing unit determines the duration of the cut-off period as a function of the value of the output voltage from the splitting bridge at the end of a cut-off period.

25 Claims, 1 Drawing Sheet

CIRCUIT FOR MEASURING THE CUT-OFF TIME OF AN ELECTRONIC SYSTEM

FIELD OF THE INVENTION

The present invention relates to a circuit for measuring the cut-off time, i.e. the duration of a period of interruption, of the power supply in an electronic system.

BACKGROUND OF THE INVENTION

Such a circuit has particular advantages when applied in apparatus for controlling the power supply to the electric motors of motor vehicle starters. Conventionally, such a control device controls the cut-off of the power supply of the electric motor of a starter once the heat engine of the vehicle has been started, or, in the case of failure to start, at the end of a predetermined period of time, so as to avoid any damage to the vehicle engine or an undue drain on the battery.

When the driver of the vehicle, having operated the ignition key, without success, turns it afresh to attempt once again to start the engine, it is desirable that the control device should prevent the starter from being supplied with power if this fresh attempt to start is made too soon. The control device must then include means which enable it to determine, when it is supplied with power again by closing of the contact by the driver, how much time has elapsed between interruption of the starter power supply and the new attempt to start.

The absence of power supplied to the control device during this dead period makes it impossible to provide an internal timer for this purpose in the control device.

Circuits known up to this time for the purpose of measuring the cut-off time of a circuit are generally RC type circuits, the capacitor of which charges when the circuit is supplied with power and discharges when the supply is cut off. When the circuit is once more energized, the measurement of the voltage across the capacitor of the circuit enables a value of the cut-off time to be determined. However, this type of circuit is severely limited as to the lengths of time which it can determine. At best, it only enables determination of time periods of the order of a fraction of a second, because of the leakage currents. In particular, the temperature stability of this type of circuit is not satisfactory, as the leakage currents are very high at high temperatures.

Equally, these RC circuits make it necessary to provide components having high values of capacitance and resistance, the values of which are such as to prevent them from being mounted within the starter casing.

DISCUSSION OF THE INVENTION

One object of the invention is to provide a circuit which enables cut-off time periods to be measured on the basis of longer times.

Another object of the invention is to provide a circuit which is reliable at high temperatures.

A further object of the invention is to provide a circuit of very simple construction, which can readily be incorporated in the starter.

According to the invention, a circuit for measuring the duration of a cut-off period in the power supply of an electronic system is characterized in that it includes, firstly, a voltage splitting bridge the supply voltage of which is derived from the power supply of the electronic system, with one branch of this bridge having a resistance which is variable as a function of temperature, and secondly, a processing unit to which the output of the splitting bridge is connected, and which determines the duration of a cut-off period, as a function of the value of the voltage at the said output at the end of the cut-off period.

Preferably, this circuit includes two such voltage splitting bridges each with a branch having a resistance which is variable as a function of temperature, the processing unit determining the duration of a cut-off period as a function of the differences in the output voltages of each of these two bridges, firstly before the start of the cut-off period, and secondly at the end of the cut-off period.

Each, variable resistance may, in particular, be of the negative temperature coefficient type.

Preferably, the output of a splitting bridge is connected to ground through an interposed interrupter which is controlled by the processing unit in a cyclic sequence of opening and closing, the cyclic ratio of which is so chosen that the value of the output voltage of the splitting bridge is maintained at a predetermined set value.

In preferred embodiments, the output of each of the two splitting bridges is connected to ground through an interposed interrupter, these two interrupters being controlled by the processing unit in accordance with cyclic sequences of opening and closing, the cyclic ratios of which are so selected that the difference between the output voltages of the said splitting bridges are maintained at a predetermined set value.

Further features and advantages of the invention will appear more clearly on a reading of the following detailed description of a preferred embodiment of the invention, which is given by way of purely illustrative and non-limiting example only and with reference to the accompanying drawings, which show the preferred embodiment of the invention.

DESCRIPTION OF A PREFERRED EMBODIMENT OF THE INVENTION

Figure 1:
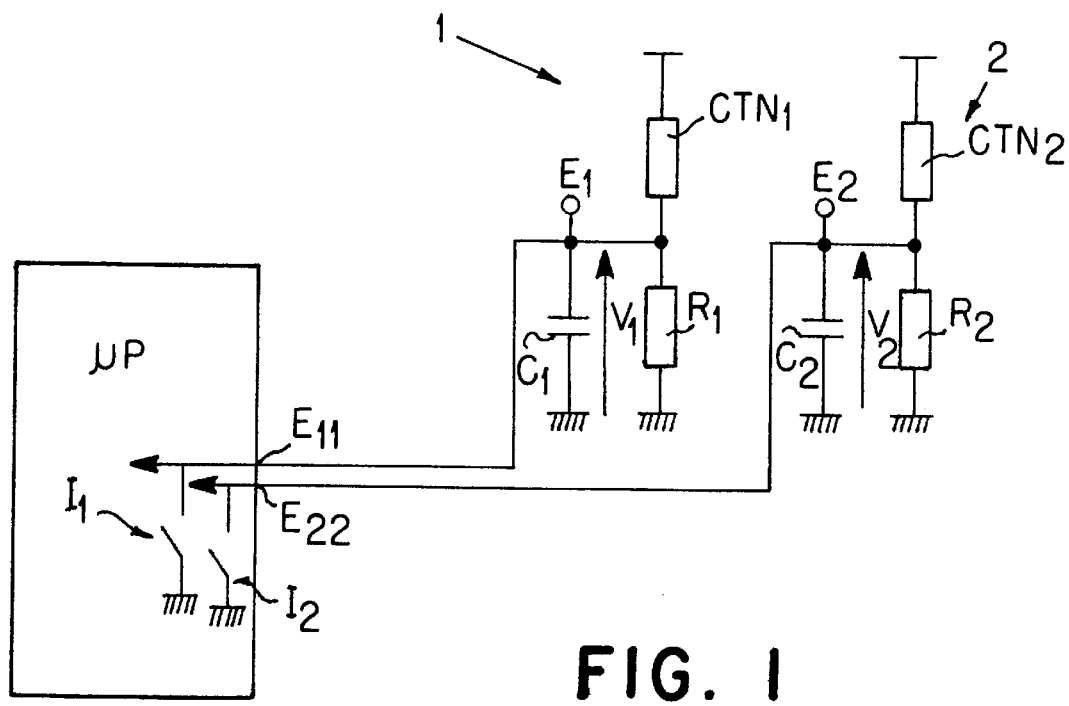
FIG. 1 is a diagrammatic representation of the preferred embodiment.

The circuit shown in FIG. 1 comprises a microprocessor $\mu P$, together with two voltage splitting bridges 1 and 2. This microprocessor exercises control of the voltage supply to an electric starter motor. The splitting bridges 1 and 2 are supplied with a regulated voltage Vdd derived from the supply voltage of the starter unit.

The splitting bridge 1 consists of a resistor $R_1$, connected between ground and a point $E_1$ which is connected to an input of the microprocessor $\mu P$, together with a resistor $CTN_1$, the value of which is variable with temperature, and which is connected between the point $E_1$ and a supply terminal at the voltage Vdd.

The splitter bridge 2 consists of a similar arrangement, and comprises a resistor $R_2$ connected between ground and a second point $E_2$ on the microprocessor, and a resistor $CTN_2$, the value of which is variable as a function of temperature, and which is connected between the point $E_2$ and a point of voltage supply at the voltage Vdd.

In FIG. 1 the inputs of the microprocessor which receive the voltages at the point $E_1$ and $E_2$ have been given the respective particular reference signs $E_{11}$, and $E_{22}$. During measuring phases, the microprocessor performs the analog/digital conversion of the voltages received on these two inputs, and the digital values which are obtained in this way are processed by the microprocessor.

During control phases, the inputs $E_{11}$, and $E_{22}$ also connect to ground the points E1 and E2 to ground, through interrupters which are indicated by the respective reference numerals $I_1$ and $I_2$. These interrupters are controlled by the microprocessor $\mu P$ when the latter is supplied with power.

Filter capacitors $C_1$ and $C_2$ are connected between the point $E_1$ and ground and the point $E_2$ and ground respectively. These capacitors also serve to stabilize the voltages at the points $E_1$ and $E_2$, with a view to the analog/digital conversion of the corresponding input of the microprocessor.

In the preferred embodiment, the resistor R has a value equal to that of the resistor $R_2$, and the variable resistors $CTN_1$ and $CTN_2$ are of the negative temperature coefficient type, and are identical to each other. However, it will be understood that resistors of the positive temperature coefficient type could be used in the same way. The resistors $CTN_1$ and $CTN_2$ are selected to be of the same value such that at ambient temperatures, the voltages $V_1$ and $V_2$ at the input points $E_1$ and $E_2$ are equal.

When an operator turns the ignition key to energize the starter of the vehicle for the first time, the microprocessor, which is supplied with power, controls opening and closing of the interrupters $I_1$ and $I_2$ in chopped sequences, the cyclic ratios of which are different for the two interrupters $I_1$ and $I_2$.

Figure 2:
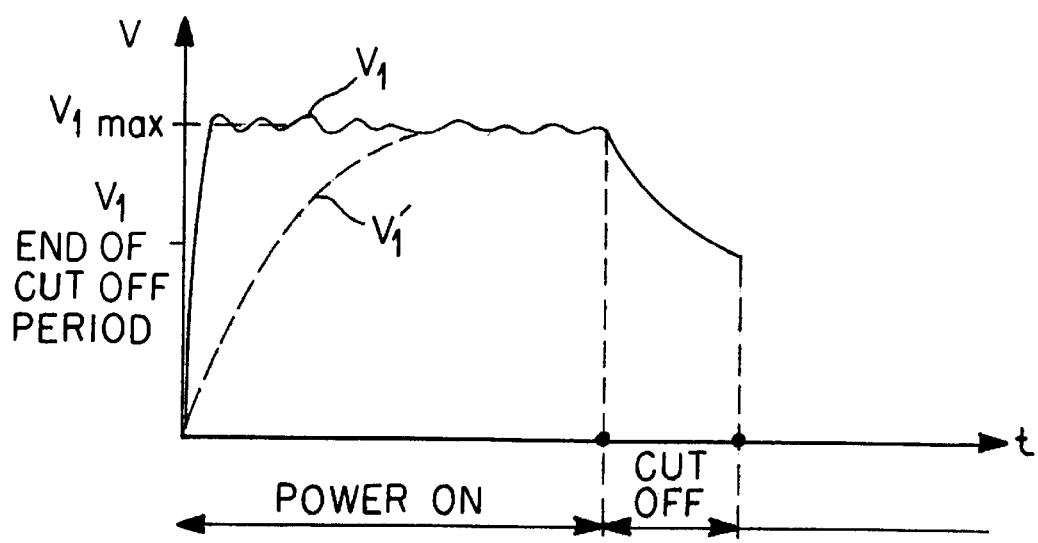
FIG. 2 is a graph which shows, as a function of time, the curve of the output voltage of a voltage splitting bridge in the embodiment of FIG. 1.

Closing of each of the interrupters $I_1$ and $I_2$ rapidly causes the resistance $CTN_1$ and $CTN_2$ to become heated, so that the voltages $V_1$ and $V_2$ rapidly attain maximum values, as is shown in particular by the curve $V_1$ in FIG. 2.

It will be noted that FIG. 2 also shows, in a broken line, the curve which shows the evolution of the voltage at the point $E_1$ in the absence of the grounding or earthing which is obtained by the chopped control of the interrupter $I_1$ (see the curve $V'_1$). If this curve $V'_1$ is compared with the curve $V_1$, it will be understood that the grounding obtained by the interrupters $I_1$, and $I_2$ enables the voltages $V_1$ and $V_2$ to very rapidly reach their maximum values, and that in the absence of those interrupters, the voltages $V_1$ and $V_2$ would develop exponentially towards these maximum values, with a time constant due to the terms $R_1C_1$, and $R_2C_2$.

The microprocessor $\mu P$ regulates the cyclic ratios of the interrupters $I_1$ and $I_2$ in such a way as to maintain the maximum values of the voltages $V_1$ and $V_2$ at the different sets of values chosen in advance, with the maximum value of the voltage $V_2$ being for example chosen to be greater than the maximum value of the voltage $V_1$.

The difference in voltage between $V_1$ and $V_2$ is thus supported over the whole of the time while the starter is supplied with power.

When the power supply to the starter is cut off, for example if the operator interrupts his actuation of the ignition key, the temperature of the resistance $CTN_1$ and $CTN_2$ then drops progressively towards ambient temperature.

When the ignition key is once again operated to restore the contact, the microprocessor and the bridges 1 and 2 are supplied with power once more. The measurement of the voltage difference $V_2 - V_1$ on this restoration of contact is processed by the microprocessor in such a way as to deduce from it the time which has elapsed between the interruption of the power supply and the new command to restore it.

By way of example, for a regulated voltage Vdd of 5 V, a value of the resistor $R_1$ of 330 ohm, a value of resistor $R_2$ of 330 ohm, and resistors $CTN_1$ and $CTN_2$ of type 470, if the voltages $V_1$ and $V_2$ are equal, it will be supposed that more than 15 seconds have elapsed between the two successive commands for energizing the starter. The microprocessor therefore authorizes the supply of power to the electric starter motor.

If, by contrast, the voltage $V_2$ is greater than $V_1$, the microprocessor will determine, according to a correspondence table, the time which has elapsed between two commands for energization of the starter, and will then perform the corresponding procedure.

The capacitors $C_1$ and $C_2$ have a capacitance which is selected to be equal to 22 nF. Interruptors $I_1$ and $I_2$, are selected such that they can support a high current.

Thus, with the circuit described above, a time base is available which enables periods of up to 15 seconds to be measured. These measurements are independent of temperature.

In addition, such a circuit has a high temperature stability, and is in particular able to support high temperatures greater than 70° C. Moreover, the components of the circuit described above have values which enable them to be easily incorporated in the starter.

Other embodiments of the invention are possible. In particular, in the case of a circuit having two voltage splitting bridges with variable resistance branches, one of the two interrupters with grounded output voltage may be maintained open, whereas the other interruptor may be controlled in a chopped mode. The splitting bridge associated with the continuously open interrupter enables the ambient temperature to be determined with respect to which the temperature of the other splitting bridge develops.

The circuit may equally have only one bridge having a resistance which is variable as a function of temperature. The other bridge is then preferably replaced by means which measure the ambient temperature of the electronic system of which the power cut-off time is measured. These means may for example comprise a semiconductor sensor or a thermocouple.

The invention has been described in the case of measurement of a power cut-off time for a motor vehicle starter, an application to which the circuitry proposed by the invention is of particular advantage. However, other applications for such time measurement can of course be envisaged for the invention.

What is claimed is:

1. A circuit for measuring the duration of a period of cut-off of the power supply in an electric system, the circuit comprising at least one voltage splitting bridge having an output for providing an output voltage and a variable resistance varying as a function of temperature, and a processing unit having an input connected to the output side of the splitting bridge, the splitting bridge having an input connected to a voltage supply, the processing unit determining the duration of a period of cut-off of the power supply as a function of the value of the output voltage from the splitting bridge at the end of a cut-off period.

2. A circuit according to claim 1 having two voltage splitting bridges, each bridge having a variable resistance varying a function of temperature, each bridge having an output for providing an output voltage connected to a corresponding input of the processing unit, the processing unit determining the duration of a cut-off period as a function of the differences between the output voltages of each of the bridges, wherein the differences between the output voltages is determined before the start of the cut-off period and at the end of the cut-off period.

3. A circuit according to claim 1, further including a temperature measuring device for measuring an ambient temperature of the electronic system, the processing unit further determining the duration of the cut-off period as a function of the temperature measured by the temperature measuring device.

4. A circuit according to claim 1, further including an interruptor connected with the processing unit, the processing unit controlling the opening and closing the interruptor in a cyclic control sequence, the interruptor being connected between the output of the splitter bridge and ground, a cyclic ratio of the cyclic control sequence being selected to maintain the value of the output voltage of the splitting bridge at a predetermined value.

5. A circuit according to claim 2, further including two interruptors, each interruptor being connected between the output of one of the splitting bridges and ground, each interruptor being connected with the processing unit, the processing unit opening and closing the interruptor in a cyclic control sequence, the control sequence applied to each interruptor having a cyclic ratio selected to maintain the differences between the output voltages of the splitting bridges at a predetermined set value.

6. A circuit according to claim 1, wherein the variable resistor is a negative temperature co-efficient resistor.

7. A circuit according to claim 1, wherein the variable resistor is a positive temperature coefficient resistor.

8. A circuit for measuring the duration of a period of cut-off of the power supply to an electric motor in a starter of a motor vehicle, the circuit comprising at least one voltage splitting bridge having an output for providing an output voltage and a variable resistance varying as a function of temperature, and a processing unit having an input side connected to the output side of the splitting bridge, the splitting bridge having an input side connected to a voltage, the processing unit determining the duration of a period of cut-off of the power supply as a function of the value of the output voltage from the splitting bridge at the end of a cut-off period.

9. A circuit according to claim 8, wherein the processing unit controls the power supply of the starter motor.

10. A circuit for measuring the duration of a period of cut-off of a power supply in an electronic system comprising:
a voltage splitting means for providing an output voltage; and
a processing means connected to the voltage splitting means for determining the duration of a period of cut-off of the power supply as a function of the value the output voltage from the voltage splitting means.

11. A circuit according to claim 10, wherein the voltage splitting means comprises at least one voltage splitting bridges comprising a variable resistance means.

12. A circuit according to claim 11, wherein the variable resistance means is variable as a function of temperature.

13. A circuit according to claim 11, wherein the voltage splitting means comprises two voltage splitting bridges, each bridge comprising a variable resistance means and providing an output voltage, wherein the processing means determines the duration of a cut-off period as a function of the differences between the output voltages of each bridge before the start of the cut-off period and at the end of the cut-off period.

14. A circuit according to claim 13, further including two interruptor means, each interruptor connected between a corresponding one of the voltage splitting bridges and ground for maintaining the value of the output voltage of the corresponding voltage bridge at a predetermined value.

15. A circuit according to claim 10, further comprising means for measuring the ambient temperature of the electronic system.

16. A circuit according to claim 15, wherein the processing means determines the duration of the cut-off period as function of temperature measured by the temperature measuring means.

17. A circuit according to claim 10, further including interruptor means connected between the voltage splitting means and ground for maintaining the value of the output voltage of the voltage splitting means at a predetermined value.

18. A circuit according to claim 17, wherein the processing means controls the opening and closing of the interruptor means in a cyclic control sequence.

19. A circuit according to claim 12, wherein the variable resistance means is negative temperature coefficient resistor.

20. A circuit according to claim 12, wherein the variable resistance means is a positive temperature coefficient resistor.

21. A circuit for measuring the duration of a period of cut-off of the power supply in an electronic system comprising:
a first voltage source and a second voltage source;
at least one voltage splitting bridge; each voltage splitting bridge having an input, intermediate point and an output, the input being connected to the first voltage source and the output providing an output voltage, each voltage splitting bridge comprises a resistor, a variable resistor and a capacitor;
the variable resistor being connected between the intermediate point and the first voltage source;
the resistor and capacitor being connected in parallel between the intermediate point and the second voltage source;
a processing unit being connected to the intermediate point for determining the duration of a period of cut-off of the power supply as a function of the value of the output voltage from the splitting bridge at the end of the cut-off period; and
at least one interruptor connected to each voltage bridge for maintaining the value of the output voltage of the corresponding bridge at a predetermined value.

22. A circuit according to claim 21, wherein the capacitor stabilizes the voltage at the intermediate point.

23. A method for measuring the duration of a period of cut-off of a power supply in an electronic system, the method comprising the steps of:
supplying voltage to a voltage splitting bridge comprising a variable resistance;
determining a cut-off period and an output voltage of the voltage of the voltage splitting bridge; and
determining the duration of a period of cut-off of the power supply as a function of the value of an output voltage from the splitting bridge at the end of a cut-off period.

24. The method according to claim 23, further comprising the step of:
measuring an ambient temperature of the electronic system and determining the duration of the cut-off period as a function of the measured temperature.

25. The method according to claim 23, further comprising the step of:
maintaining the value of the output voltage of the splitting bridge at a predetermined value.

* * * * *